United States Patent [19]

Morita et al.

[11] Patent Number: 4,532,053

[45] Date of Patent: Jul. 30, 1985

[54] MICELLAR SLUG FOR OIL RECOVERY

[75] Inventors: Hiroshi Morita, Chiba; Yasuyuki Kawada, Funabashi; Jun-ichi Yamada, Narashino; Toshiyuki Ukigai, Chiba, all of Japan

[73] Assignee: Lion Corporation, Tokyo, Japan

[21] Appl. No.: 458,360

[22] Filed: Jan. 17, 1983

[30] Foreign Application Priority Data

Jan. 28, 1982 [JP] Japan ................................. 57-10858

[51] Int. Cl.$^3$ ............................................. E21B 43/22
[52] U.S. Cl. ................... 252/8.55 D; 166/274
[58] Field of Search ................ 252/8.55 D, 555, 312; 166/274, 275

[56] References Cited

U.S. PATENT DOCUMENTS

| | | | |
|---|---|---|---|
| 3,376,336 | 4/1968 | Stein et al. ...................... | 252/555 X |
| 3,428,654 | 2/1969 | Rubinfeld et al. .............. | 252/555 X |
| 3,506,070 | 4/1970 | Jones .................................. | 166/273 |
| 3,508,611 | 4/1970 | Davis et al. ..................... | 252/312 X |
| 3,536,136 | 10/1970 | Jones ................................ | 252/312 X |
| 3,808,156 | 4/1974 | Gorsich et al. ................. | 252/555 X |
| 3,981,361 | 9/1976 | Healy .............................. | 166/274 X |
| 3,990,515 | 11/1976 | Wilchester et al. ................. | 166/273 |

FOREIGN PATENT DOCUMENTS 1031686  5/1978  Canada ............................... 166/274

Primary Examiner—Herbert B. Guynn
Attorney, Agent, or Firm—Armstrong, Nikaido, Marmelstein, & Kubovcik

[57] ABSTRACT

A micellar slug for use in the recovery of oil, the slug containing a hydrocarbon, an aqueous medium, a surfactant, and a cosurfactant. The surfactant contains as an essential component an internal olefin sulfonate. This micellar slug has an excellent capability for decreasing an interfacial tension between oil and water and an excellent salinity tolerance and hard-water resistance. Furthermore, the micro-emulsion can be formed from this micellar slug in a wide composition range.

4 Claims, No Drawings

MICELLAR SLUG FOR OIL RECOVERY

This invention relates to a micellar slug suitable for use in a micellar drive for recovering oil from subterranean reservoirs. More specifically, it relates to a micellar slug capable of forming micro-emulsions at a high salt concentration.

It is well-known in the art that the so-called "primary recovery" methods, including pumping methods, can recover only a portion of the petroleum or crude oil (referred to as "oil" herein after) from subterranean reservoirs and leave substantial amounts of oil in the subterranean reservoirs.

In order to recover the remaining large amounts of oil from the subterranean reservoirs, the so-called "secondary recovery" methods have been proposed, wherein, for example, water or gas is injected into the subterranean reservoirs from an injection well at a pressure sufficient to increase the flowability of oil, steam is injected into subterranean reservoirs so as to effect the displacement of oil toward a production well, or oil in subterranean reservoirs is partially burned to heat the subterranean reservoirs so as to decrease the viscosity of the oil and increase the flowability of the oil.

Furthermore, the so-called various "tertiary recovery" methods, including a combination of secondary recovery methods and improved secondary recovery methods, have been proposed, wherein surfactants or water-soluble polymers are utilized. These methods are generally called "enhanced oil recovery" (EOR) methods.

Among the surfactants EOR methods, the recent "micellar drive" methods are to be noted. According to these methods, a micellar slug, that is, a clear micro-emulsion derived from water and oil such as petroleum, petroleum distillates, or fuel oil, is injected under pressure into the subterranean reservoirs for the recovery of oil in the subterranean reservoirs. These EOR methods are disclosed in, for example, U.S. Pat. Nos. 3506070, 3613786, 3740343, 3983940, 4017405, and 4059154. These prior arts disclose that various kinds of surfactants including anionic-, nonionic-, and cationic-type surfactants can be used alone or in any mixture thereof in the formation of micellar slugs. Examples of such surfactants are petroleum sulfonates, alkylaryl sulfonates, dialkyl sulfosuccinates, alkane sulfonates, polyoxyethylene alkylether sulfates, polyoxyethylene alkylethers, polyoxyethylene alkylphenylethers, polyol fatty acid esters, alkyltrimethyl ammonium salts, and dialkyldimethly ammonium salts.

The surfactants used in the formation of a micellar slug must be available at a low cost, while still displaying the required performances, since a large amount of a micellar slug is necessary to recover oil from subterranean reservoirs. In addition, the numerous oil production wells or oilfields are present in the world include subterranean reservoirs with a variety of propeties. The available water also varies from soft water containing no substantial amount of inorganic salts to brine containing large amounts of inoganic salts and polyvalent metallic ions. Thus, the surfactants used in micellar slugs should also have good thermal stability, salinity tolerance, and hard-water resistance.

It is known in the art that petroleum sulfonate is an optimum surfactant usable as an injection fluid in a micellar drive due to its availability and low cost, since a large amount of an injection fluid is used in a micellar drive. However, a problem exists in that petroleum sulfonate has an unsatisfactory salinity tolerance and hard-water resistance, and, therefore, can be applied only for certain oilfields. For this reason, various attempts have been made to improve the properties of petroleum sulfonate by using petroleum sulfonate together with other surfactants or water-soluble polymer-thickening agents. However, micellar slugs having the desired properties and a satisfactory cost have not been obtained.

We have proposed, in U.S. patent application No. 415,840 filed on Sept. 8, 1982, the use of an alpha-olefin sulfonate as a surfactant capable of providing a micellar slug having an interfacial tension decreasing capability equal to or more than that of a micellar slug containing petroleum sulfonate and having an excellent salinity tolerance and hard-water resistance and a relatively high viscosity. However, the micro-emulsion formed when a micellar slug is prepared by using an alpha-olefin sulfonate, is likely to be destroyed when injected under pressure into subterranean reservoirs due to the fact that the composition range within which a micro-emulsion can be formed is not very wide. Accordingly, this micellar slug should be further improved from a practical viewpoint.

The objects of the present invention are to eliminate the above-mentioned problems of the prior arts and to provide, for the recovery of oil, a micellar slug, having an excellent oil-water interfacial tension decreasing capability and an excellent salinity tolerance and hard-water resistance, and being capable of forming a micro-emulsion in a wide composition range.

A further object of the present invention is to provide an oil recovery process using a micellar slug.

Other objects and advantages of the present invention will be apparent from the following description.

In accordance with the present invention, there is provided a micellar slug, for the recovery of oil, consisting essentially of a hydrocarbon, an aqueous medium, a surfactant, and a cosurfactant, the surfactant containing, as an essential component, an internal olefin sulfonate having 10 to 30 carbon atoms.

In accordance with the present invention, there is also provided a process for producing oil from an oil-bearing subterranean reservoir penetrated by a well which comprises the steps of injecting into the reservoir through the well a micellar slug consisting essentially of a hydrocarbon, an aqueous medium, a surfactant, and a cosurfactant, the surfactant containing, as essential constituents, an internal olefin sulfonate having 10 to 30 carbon atoms; injecting into the reservoir at least one driving fluid; and recovering oil from the resevoir through the production well.

The micellar slugs desireably used for the recovery of oil are transparent micro-emulsions containing about 4% to about 90% by weight of a hydrocarbon, about 4% to about 92% by weight of an aqueous medium, about 3% to about 30% by weight of a surfactant containing, as an essential constituent, an internal olefin sulfonate having 10 to 30 carbon atoms, and about 0.1% to about 20% by weight of a cosurfactant.

The aqueous medium usable in the formation of the micellar slug of the present invention includes soft water, water containing inorganic salts, and brine. For example, rain water, river water, lake water, subterranean water, oil stratum water, and seawater can be freely used in the formation of the micellar slug of the present invention.

As in the case of an alpha-olefin sulfonate, the internal olefin sulfonates (i.e., IOS) having good hard-water resistance used as an essential constituent of the surfactant in the micellar slugs of the present invention result in micellar slugs with an excellent hard-water resistance of about 5,000 ppm of a Mg ion (i.e., about 2.6% by weight of MgSo4). Furthermore, the micellar slugs of the present invention have a surprisingly high resistance to alkali metal salts and can contain water including about 10% by weight of alkaline metal salts irregardless of the kinds of alkali metal salts. When another adequate surfactant is used together with the internal olefin sulfonate or when a certain cosurfactant is selected, brine including up to about 15% by weight of inorganic salts can be used in the formation of the micellar slugs of the present invention. Furthermore, it has been found that an increase in the concentration of inorganic salts in the micellar slugs of the present invention results in a further decrease in the interfacial tension between oil and water. Thus, water (or brine) usable in the formation of the micellar slugs of the present invention can contain 0% to about 15% by weight, desirably about 0.5% to about 12% by weight and more desirably about 1% to about 10% by weight, of inorganic salts. Typical examples of the inorganic salts contained in the water (or brine) are NaCl, KCl, Na2SO4, and K2SO4. For instance, seawater contains about 3.5% by weight of inorganic salts including about 1,600 ppm, in terms of a Mg ion, of divalent metal ions. This salt concentration is within the desirable salt concentration range of the present invention.

The internal olefin sulfonates usable as an essential surfactant in the present invention are those obtained by sulfonating internal olefins containing as a main constituent vinylene-type monoolefin having a general formula:

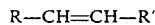

R—CH=CH—R' wherein R and R' are independently straight- or branched-chain saturated hydrocarbon radicals having 1 or more carbon atoms provided that the total carbon atom numbers of R and R' is 8 to 28, desirably 10 to 24, and optionally containing about 33% by weight (about one third of the olefins) or less of tri-substituted type monoolefins, followed by neutralizing the sulfonated products with appropriate bases and, then, optionally, hydrolyzing the neutralized products. The internal olefin sulfonates thus prepared generally contain about 20% to about 60% by weight of alkenyl sulfonates having double bonds and about 80% to about 40% by weight of hydroxyalkane sulfonates and also contain about 80% by weight or more of monosulfonates and about 20% by weight or less of disulfonates. It should be noted, however, that internal olefin sulfonates having the compositions different from the above-mentioned composition ratios can be prepared by appropriately selecting the sulfonation conditions and hydrolysis conditions. Generally speaking, the increase in the carbon atom number of the internal olefin tends to result in an increase in the composition ratio of the alkenylsulfonate. On the other hand, the increase in the mol ratio of the sulfonating agent to the internal olefin during the sulfonation tends to result in an increase in the composition ratio of the disulfonate.

A relatively high lipophilic internal olefin sulfonate or a relatively high hydrophilic internal olefin sulfonate can be optionally used in the micellar slugs according to the present invention depending upon the properties of the oilfields and subterranean reservoirs, the water to be used (or brine), and the cosurfactancts. The internal olefin sulfonates used in the present invention are desirably those having 12 to 26 carbon atoms and, more desirably, those containing 50% by weight or more of internal olefin sulfonates having 14 to 22 carbon atoms.

The internal olefin sulfonates usable in the present invention can be alkali metal salts, alkaline earth metal salts, ammonium salts, and organic amine salts thereof. The desirable counter cations are Na, K, Mg, Ca, NH4, and alkanolammonium. The sodium salts are readily available at a low cost.

Examples of internal olefin sulfonates usable in the formation of the micellar slugs of the present invention are: internal olefin sulfonate having 10, 12, 14, 16, 18, 20, 22, 24, 26, 12-16, 14-16, 14-18, 14-20, 15-18, 15-20, 16-18, 16-20, 18-20, 18-24, and 20-24 carbon atoms. These sulfonates may be used alone or in any mixture thereof.

As mentioned above, the micellar slugs of the present invention contain about 3% to about 30% by weight of the surfactant. However, the micellar slugs desirably contain about 5% to about 25% by weight of the surfactant, taking into consideration both low interfacial tensions and reasonable cost. The amount of the higher internal olefin sulfonates having 10 to 30 carbon atoms should be at least 50% by weight, desirably 60% by weight or more, based on the total amount of the surfactants contained in the micellar slugs.

The hydrocarbons usable as an oil component in the present invention include, for example, petroleum, liquefied petroleum gas, crude gasoline (naphtha), kerosine, diesel oil, and fuel oil. The recovered petroleum is desirably used due to its low cost and availability as well as its composition, which is similar to that of the oil contained in subterranean reservoirs. As mentioned above, the micellar slugs of the present invention can contain about 4% to about 90% by weight of hydrocarbons. The desirable concentration of hydrocarbons is within the range of about 5% to about 40% by weight whereby an oil-in-water type emulsion is formed, since the use of a large amount of hydrocarbons is not economical.

The cosurfactants used in the formation of the micellar slugs of the present invention are an essential constituent for forming micro-emulsions associated with the surfactants. The cosurfactants usable in the present invention are those having an alcoholic hydroxyl group. The desirable cosurfactants are alcohols having the general formula:

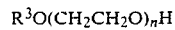

R³O(CH2CH2O)$_n$H wherein n is a number of from 0 to about 4 and R³ is an alkyl or alkenyl group having 2 to 8 carbon atoms when n is zero and an alkyl, alkenyl, or alkylphenyl group having 6 to 18 carbon atoms when n is not zero. The aliphatic groups of R³ may be straight-chain or branched-chain groups.

Examples of such alcohols are ethanol, propanols, butanols, pentanols, hexanols, 2-ethylhexanol or other octanols, polyoxyethylene hexylethers ($\bar{n}=1$), polyoxyethylene decylethers ($\bar{n}=2$), polyoxyethylene tridecylethers ($\bar{n}=4$), polyoxyethylene butylphenylethers ($\bar{n}=2$), polyoxyethylene nonylphenylethers ($\bar{n}=3$), and polyoxyethylene dodecylphenylethers ($\bar{n}=4$).

As mentioned above, the micellar slugs of the present invention can contain about 0.1% to about 20% by weight of the cosurfactants. However, the desirable concentration of the cosurfactants is within the range of about 1% to about 10% by weight from the viewpoints of the stability of the micro-emulsions and the decreasing capacity for interfacial tension between oil and water.

As mentioned above, the micellar slugs of the present invention contain internal olefin sulfonates as an essential or major constituent of the surfactants. However, other auxiliary surfactants can also be included, together with the internal olefin sulfonates, taking into consideration the desired interfacial tension between oil and water, the desired viscosity, the adsorbability of the surfactants to rocks constituting the subterranean reservoirs, and the cost and availability of the surfactants.

Examples of such auxiliary surfactants are anionic surfactants and nonionic surfactants such as petroleum sulfonates, alkylbenzene sulfonates, polyoxyethylene alkylether sulfates, dialkyl sulfosuccinates, alpha-olefin sulfonates, paraffin sulfonates, lower internal olefin sulfonates, soaps, higher alcohol ethoxylates, alkylphenol ethoxylates, polyol fatty acid esters, fatty acid alkylol amides, and polyoxyethylene fatty acid amides.

The micellar slugs of the present invention have an excellent hard-water resistance and a remarkably improved salinity tolerance and are capable of forming micro-emulsions in the presence of a large amount of inorganic salts due to the use of an internal olefin sulfonate as an essential constituent of the surfactant. Furthermore, the micellar slugs of the present invention can form the desired good micro-emulsions even when brine containing a large amount of inorganic salts is used. Accordingly, the desired viscosity of the micellar slugs can be readily adjusted within a wide range by changing the concentration of the inorganic salt in the micellar slugs. Especially, the interfacial tension decreasing capability of the internal olefin sulfonate is larger than that of petroleum sulfonate and an alpha-olefin sulfonate. Therefore, the micellar slugs of the present invention can recover petroleum from an oil-bearing subterranean reservoir at a high recovery level. Furthermore, when the micellar slugs of the present invention are injected under pressure into an oil-bearing subterranean reservoir, the micro-emulsions can be maintained within a wide composition range against the changes in the composition thereof by the mixing with oil and subterranean water since the internal olefin sulfonates can form micro-emulsions within a wide composition range. This advantageous feature of the micellar slugs of the present invention is especially very important in the micellar drive method since the maintaining of the micro-emulsions in the subterranean reservoirs largely affects the recovery of petroleum.

The viscosity of the micellar slugs of the present invention is likely to be lower than that of an alpha-olefin sulfonate. According, when a micellar slug having a high viscosity is desired, an appropriate known thickening agent such as a water-soluble polymer can be added to the micellar slugs. Examples of thickening agents usable in the formation of the micellar slugs are heteropolysaccharides produced by micro-organisms, naphthalenesulfonic acid-formaldehyde condensates, polyacrylamides, polyacrylates, hydroxyethylcelluloses, and carboxymethylcelluloses.

The micellar slugs of the present invention can be readily obtained by any known method of production. For example, the hydrocarbons, the surfactants, the aqueous medium, and the cosurfactants can be mixed in any mixing order by using conventional mixing devices, mixing temperatures, and mixing pressures.

The recovery of oil from subterranean reservoirs can be carried out by means of any conventional micellar drive method by using the micellar slugs of the present invention. For instance, the micellar slugs are injected under pressure into at least one injection well of the subterranean reservoirs. Then, at least one driving fluid such as flood water and/or aqueous solution of the above-mentioned thickening agent is injected into the injection well so as to transfer or drive the remaining oil toward an oil production well and to recover the oil from the production well. The suitable amount of the micellar slugs injected into the injection well is about 5% to about 15% by volume of the porosity of the subterranean reservoirs.

As mentioned hereinabove, according to the present invention, micellar slugs having a good hard-water resistance, a good salinity tolerance, and a very small interfacial tension between oil and water are provided, and the viscosity of the micellar slugs can be readily controlled. Furthermore, according to the present invention, the micro-emulsion can be formed from the micellar slugs in a wide composition range. As a result, the following remarkable advantageous features can be obtained:

(1) Either soft water or hard water can be freely used as the aqueous medium of the micellar slugs;

(2) The micellar slugs injected into the subterranean reservoirs are subjected to no substantial adverse affects by inorganic salts present in the subterranean reservoirs;

(3) The micellar drive method can be readily applied in subterranean reservoirs containing oil having a low viscosity to a high viscosity; and (4) A high oil recovery efficiency can be attained since the micro-emulsions are not destroyed by oils and water contained in the subterranean reservoirs.

The present invention now will be further illustrated by, but is by no means limited to, the following examples, in which the component ratios or amounts of samples used are based on "% by weight" unless otherwise specified.

EXAMPLE 1

Micellar slug compositions containing anionic surfactants, cosurfactants, hydrocarbons, and aqueous media were prepared.

The anionic surfactants used were sodium $C_{14}$–$C_{18}$ internal olefin sulfonate (IOS-Na), sodium $C_{20}$–$C_{24}$ internal olefin sulfonate (IOS-Na), sodium $C_{14}$–$C_{18}$ alpha-olefin sulfonate (AOS-Na), sodium $C_{20}$–$C_{24}$ alpha-olefin sulfonate (AOS-Na), or petroleum sulfonate TRS-10 (manufactured by Witco Chemical Corp.). The cosurfactants used were amyl alcohol or isopropyl alcohol. The hydrocarbons used were kerosine or fuel oil (ASTM No. 2 fuel oil). The aqueous media used were seawater having a saline content of about 3.5% and an alkaline earth metal ion concentration of about 1,600 ppm, or soft water.

The micellar slugs were prepared by first mixing the surfactant and the aqueous medium and, then, adding the cosurfactant and the hydrocarbon to the mixture, while stirring it.

The compositions and properties of the micellar slugs thus obtained are shown in Table 1.

In Table 1 and the following Tables, "IOS" and "AOS" are abbreviations for an internal olefin sulfonate and an alpha-olefin sulfonate, respectively. Visual appearance was determined according to the following:

○ . . . A micro-emulsion was formed

× . . . A suspension, rather than a micro-emulsion was formed.

The interfacial tensions shown in the following tables are those between the micellar slugs and the oil. The petroleum recovery (%) was determined according to a method of Yamazaki, et al, disclosed in Journal of the Japanese Association of Petroleum Technologists, Vol. 45, No. 3, pp. 125 to 132, May, 1980.

Sample Nos. 1, 5, 7, 9, 11, 13, and 15 to 19 are those according to the present invention and sample Nos. 2, 3, 4, 6, 8, 10, 12, 14, and 20 to 22 are comparative examples.

eralized water to predetermined saline concentrations were used.

The compositions and the properties of the samples are shown in Table 2.

EXAMPLE 3

Micellar slug samples were prepared in the same manner as described in Example 1 except that various brines were obtained by adding 1% by weight of sodium chloride and magnesium chloride and/or calcium chloride so as to provide the predetermined bivalent metal ion concentration to demineralized water.

The compositions and the properties of the samples are shown in Table 3.

EXAMPLE 4

Micellar slug samples were prepared in the same manner as described in Example 1 except that a lower alcohol and another cosurfactant were used to decrease the viscosity of the micellar slug.

The compositions and the properties of the samples are shown in Table 4.

TABLE 1

| Sample No. | 1 | 2* | 3* | 4* | 5 | 6* | 7 | 8* | 9 | 10* | 11 |
|---|---|---|---|---|---|---|---|---|---|---|---|
| Anionic surfactant | | | | | | | | | | | |
| $C_{14}$–$C_{18}$ IOS—Na | 16 | | | 14 | | | | | 10.5 | | |
| $C_{20}$–$C_{24}$ IOS—Na | | | | | | | 10.5 | | | | 10.5 |
| $C_{14}$–$C_{18}$ AOS—Na | | | | | | | | | | | |
| $C_{20}$–$C_{24}$ AOS—Na | | | | | | | | | | | |
| Petroleum sulfonate | | 16 | 16 | 16 | | 14 | | 10.5 | | 10.5 | |
| Cosurfactant | | | | | | | | | | | |
| Amyl alcohol | 4 | 4 | | | 6 | 6 | 4.5 | 4.5 | 4.5 | 4.5 | 4.5 |
| Isopropyl alcohol | | | 4 | 4 | | | | | | | |
| Hydrocarbon | | | | | | | | | | | |
| Kerosine | 8 | 8 | 8 | 8 | 24 | 24 | 25.5 | 25.5 | | | |
| Fuel oil | | | | | | | | | 8.5 | 8.5 | 17 |
| Water | | | | | | | | | | | |
| Seawater | 72 | 72 | 72 | | 56 | 56 | 59.5 | 59.5 | 76.5 | 76.5 | 68 |
| Soft water | | | | 72 | | | | | | | |
| Properties | | | | | | | | | | | |
| Visual appearance | ○ | × | × | ○ | ○ | × | ○ | × | ○ | × | ○ |
| Interfacial tension (× $10^{-2}$ dyne/cm) | 0.64 | — | — | 0.72 | 0.69 | — | 0.12 | — | 0.11 | — | 0.09 |
| Viscosity (centipoise) | 18 | — | — | 5 | 22 | — | 19 | — | 5 | — | 7 |
| Petroleum recovery (%) | 92 | — | — | 93 | 96 | — | 98 | — | 95 | — | 97 |

| Sample No. | 12* | 13 | 14* | 15 | 16 | 17 | 18 | 19 | 20* | 21* | 22* |
|---|---|---|---|---|---|---|---|---|---|---|---|
| Anionic surfactant | | | | | | | | | | | |
| $C_{14}$–$C_{18}$ IOS—Na | | | | 14 | 14 | 14 | 14 | | | | |
| $C_{20}$–$C_{24}$ IOS—Na | | 7 | | | | | | 14 | | | |
| $C_{14}$–$C_{18}$ AOS—Na | | | | | | | | | | 14 | |
| $C_{20}$–$C_{24}$ AOS—Na | | | | | | | | | 14 | | 14 |
| Petroleum sulfonate | 10.5 | | 7 | | | | | | | | |
| Cosurfactant | | | | | | | | | | | |
| Amyl alcohol | 4.5 | 3 | 3 | | | 6 | 6 | 6 | 6 | 6 | 6 |
| Isopropyl alcohol | | | | 6 | 6 | | | | | | |
| Hydrocarbon | | | | | | | | | | | |
| Kerosine | | | | 24 | | | | 40 | 24 | | |
| Fuel oil | 17 | 18 | 18 | | 24 | 40 | 50 | | | 40 | 40 |
| Water | | | | | | | | | | | |
| Sea water | 68 | 72 | 72 | 56 | 56 | 40 | 30 | 40 | 56 | 40 | 40 |
| Soft water | | | | | | | | | | | |
| Properties | | | | | | | | | | | |
| Visual appearance | × | ○ | × | ○ | ○ | ○ | ○ | ○ | ○ | × | × |
| Interfacial tension (× $10^{-2}$ dyne/cm) | — | 0.11 | — | 0.31 | 0.23 | 0.07 | 0.006 | 0.05 | 0.82 | — | — |
| Viscosity (centipoise) | — | 6 | — | 12 | 16 | 18 | 23 | 27 | 55 | — | — |
| Petroleum recovery (%) | — | 97.2 | — | 95 | 96 | 95 | 98 | 95 | — | — | — |

*Comparative example

EXAMPLE 2

Micellar slug samples were prepared in the same manner as described in Example 1 except that various brines obtained by dissolving sodium chloride in demin-

TABLE 2

| Sample No. | 23* | 24* | 25 | 26 | 27 | 28 | 29 | 30 |
|---|---|---|---|---|---|---|---|---|
| Anionic surfactant | | | | | | | | |
| $C_{14}$–$C_{18}$ IOS—Na | | | 10.5 | | 10.5 | | | |

TABLE 2-continued

| Sample No. | 23* | 24* | 25 | 26 | 27 | 28 | 29 | 30 |
|---|---|---|---|---|---|---|---|---|
| $C_{20}$—$C_{24}$ IOS—Na | | | 10.5 | | 14 | | 10.5 | 10.5 |
| Petroleum sulfonate | 16 | 16 | | | | | | |
| Cosurfactant | | | | | | | | |
| Amyl alcohol | | | 4.5 | | 6 | 4.5 | 4.5 | |
| Isopropyl alcohol | 3 | 4 | | 4.5 | | | | 4.5 |
| Hydrocarbon | | | | | | | | |
| Kerosine | 16 | 8 | | 8.5 | 8 | | | 25.5 |
| Fuel oil | | | 17 | | | 17 | 17 | |
| Water | | | | | | | | |
| Brine NaCl 0.5% | 64 | | 68 | | | | | 59.5 |
| Brine NaCl 2.0% | | 72 | | | | | 68 | |
| Brine NaCl 4.0% | | | | 76.5 | 72 | | | |
| Brine NaCl 8.0% | | | | | | 68 | | |
| Properties | | | | | | | | |
| Visual appearance | o | x | o | o | o | o | o | o |
| Interfacial tension ($\times 10^{-2}$ dyne/cm) | 1.4 | — | 0.10 | 0.27 | 0.95 | 0.52 | 0.07 | 0.07 |
| Viscosity (centipoise) | 8 | — | 18 | 12 | 42 | 19 | 20 | 19 |
| Petroleum recovery (%) | 95 | — | 97 | 95 | 95 | 98 | 97 | 95 |

*Comparative example

TABLE 3

| Sample No. | 31* | 32 | 33 | 34 | 35 | 36 | 37 |
|---|---|---|---|---|---|---|---|
| Anionic surfactant | | | | | | | |
| $C_{14}$—$C_{18}$ IOS—Na | | 12 | 12 | | 16 | | |
| $C_{20}$—$C_{24}$ IOS—Na | | | | 10.5 | | 1 | 10.5 |
| Petroleum sulfonate | 16 | | | | | | |
| Cosurfactant | | | | | | | |
| Amyl alcohol | | 3 | 8 | 4.5 | 4 | 3 | 4.5 |
| Isopropyl alcohol | 4 | | | | | | |
| Hydrocarbon | | | | | | | |
| Kerosine | 16 | 8.5 | 16 | 17 | 8 | 18 | 25.5 |
| Water (NaCl: 1 wt %) | | | | | | | |
| Brine: Mg ion 500 PPM | 64 | 76.5 | | | | | |
| Brine: Mg ion 1,000 PPM | | | 64 | | | | |
| Brine: Mg ion 3,000 PPM | | | | 68 | | | |
| Brine: Mg ion 4,000 PPM | | | | | 72 | | |
| Brine: Ca ion 1,500 PPM | | | | | | 72 | |
| Mg ion 2,000 ppm + Ca ion 1,000 ppm | | | | | | | 59.5 |
| Properties | | | | | | | |
| Visual appearance | x | o | o | o | o | o | o |
| Interfacial tension ($\times 10^{-2}$ dyne/cm) | — | 1.5 | 0.9 | 0.07 | 0.6 | 0.27 | 0.9 |
| Viscosity (centipoise) | — | 12 | 21 | 16 | 3 | 6 | 27 |
| Petroleum recovery (%) | — | 95 | 97 | 98 | 96 | 98 | 98 |

*Comparative example

TABLE 4

| Sample No. | 38 | 39 | 40 | 41 | 42 | 43 | 44 | 45 |
|---|---|---|---|---|---|---|---|---|
| Anionic surfactant | | | | | | | | |
| $C_{14}$—$C_{18}$ IOS—Na | 14 | 14 | | | 13 | 16 | | |
| $C_{20}$—$C_{24}$ IOS—Na | | | 10.5 | 10.5 | | | 10.5 | 14 |
| Cosurfactant | | | | | | | | |
| Butanol | | | | | | | | 6 |
| Amyl alcohol | 6 | 5 | 4.5 | 3 | | | | |
| Polyoxyethylene nonylphenyl ether (n = 2) | | | | | 3 | 2 | 3 | |
| Hydrocarbon | | | | | | | | |
| Kerosine | 24 | 22 | 25.5 | 23 | 8 | 8 | | 24 |
| Fuel oil | | | | | | | 17 | |
| Water | | | | | | | | |
| Sea water | 56 | 56 | 59.5 | 59.5 | | | 68 | |
| Brine (NaCl: 2 wt %) | | | | | 72 | 72 | | 56 |
| Ethylene glycol | | 3 | | 4 | | | | |
| Propylene glycol | | | | | 4 | 2 | 1.5 | |
| Properties | | | | | | | | |
| Visual appearance | o | o | o | o | o | o | o | o |
| Interfacial tension ($\times 10^{-2}$ dyne/cm) | 0.78 | 0.6 | 0.4 | 0.53 | 1.78 | 1.8 | 0.57 | 0.42 |
| Viscosity (centipoise) | 32 | 12 | 32 | 6 | 7 | 4 | 5 | 25 |
| Petroleum recovery (%) | 95 | 96 | 98 | 95 | 96 | 96 | 97 | 98 |

EXAMPLE 5

Micellar slug samples were prepared in the same manner as described in Example 1 except that the counter ions of the internal olefin sulfonates were changed.

The compositions and the properties of the samples are shown in Table 5A (monovalent cations) and Table 5B (divalent cations).

EXAMPLE 6

Micellar slug samples were prepared in the same manner as described in Example 1 except that two or more internal olefin sulfonates were used together.

The compositions and the properties of the samples are shown in Table 6.

TABLE 5A

| Sample No. | 46 | 47 | 48 | 49 | 50 | 51 | 52 | 53 | 54 |
|---|---|---|---|---|---|---|---|---|---|
| Anionic surfactant | | | | | | | | | |
| $C_{13}$—$C_{14}$ IOS—K | 16 | 16 | | | | | | | |
| $C_{13}$—$C_{14}$ —$NH_4$ | | | 14 | 14 | | | | | |
| $C_{13}$—$C_{14}$ —$NH_2$ $(C_2H_4OH)_2$ | | | | | 12 | 16 | | | |
| $C_{18}$—$C_{20}$ IOS—$NH_4$ | | | | | | | 16 | | |
| $C_{25}$—$C_{28}$ IOS—K | | | | | | | | 18 | |
| $C_{25}$—$C_{28}$ —$NH_4$ | | | | | | | | | 14 |
| Cosurfactant | | | | | | | | | |
| Butanol | | | 6 | 3 | | 4 | | | 3 |
| Amyl alcohol | 4 | 4 | | 3 | 3 | | 4 | 2 | 3 |
| Hydrocarbon | | | | | | | | | |
| Kerosine | 20 | 40 | 50 | 25 | | | 15 | | |
| Fuel oil | | | | | 5 | 30 | | 35 | 40 |
| Water | | | | | | | | | |
| Brine (NaCl 0.5%) | | | 30 | 55 | 80 | 50 | 65 | | 40 |
| Brine (NaCl 2.0%) | | | | | | | | 45 | |
| Sea water | 60 | 40 | | | | | | | |
| Properties | | | | | | | | | |
| Visual appearance | o | o | o | o | o | o | o | o | o |
| Interfacial tension ($\times 10^{-2}$ dyne/cm) | 0.85 | 1.03 | 0.92 | 2.52 | 2.75 | 1.19 | 1.13 | 0.73 | 3.41 |
| Viscosity (centipoise) | 17 | 26 | 25 | 17 | 9 | 30 | 18 | 25 | 23 |
| Petroleum recovery (%) | 95 | 97 | 95 | 95 | 95 | 95 | 95 | 96 | 95 |

TABLE 5B

| Sample No. | 55 | 56 | 57 | 58 | 59 | 60 |
|---|---|---|---|---|---|---|
| Anionic surfactant | | | | | | |
| $C_{13}$—$C_{14}$ IOS—Mg | 7 | 7 | | | | |
| $C_{13}$—$C_{14}$ —Ca | | | 11.5 | 11.5 | | |
| $C_{18}$—$C_{20}$ IOS—Mg | | | | | 8 | |
| $C_{25}$—$C_{28}$ IOS—Mg | | | | | | 9 |
| Cosurfactant | | | | | | |
| Butanol | 3 | 3 | | 4.5 | 2 | |
| Amyl alcohol | | | 4.5 | | | 1 |
| Hydrocarbon | | | | | | |
| Kerosine | | | | | | 10 |
| Fuel oil | 10 | 60 | 30 | 70 | 40 | |
| Water | | | | | | |
| Brine (NaCl 0.5%) | | | 55 | 15 | | 80 |
| Brine (NaCl 2.0%) | 80 | 30 | | | 50 | |
| Seawater | | | | | | |
| Properties | | | | | | |
| Visual appearance | o | o | o | o | o | o |
| Interfacial tension ($\times 10^{-2}$ cyne/cm) | 3.46 | 1.41 | 0.55 | 0.72 | 1.82 | 2.91 |
| Viscosity (centipoise) | 7.2 | 18 | 22 | 26 | 27 | 12 |
| Petroleum recovery (%) | 95 | 96 | 96 | 95 | 95 | 95 |

TABLE 6

| Sample No. | 61 | 62 | 63 | 64 | 65 |
|---|---|---|---|---|---|
| Anionic surfactant | | | | | |
| $C_{13}$—$C_{14}$ IOS—Na | 6 | 5 | 5 | 7 | |
| $C_{13}$—$C_{14}$ —Mg | 6 | 5 | | | |
| $C_{13}$—$C_{14}$ —Ca | | 5 | | | |
| $C_{18}$—$C_{20}$ IOS—Na | | | 5 | | 7 |
| $C_{18}$—$C_{20}$ —Mg | | | | | 7 |
| $C_{25}$—$C_{28}$ IOS—Na | | | 5 | | |
| $C_{25}$—$C_{28}$ IOS—$NH_4$ | | | | 7 | |
| Cosurfactant | | | | | |
| Butanol | 3 | | | | |
| Amyl alcohol | | 5 | 5 | 6 | 6 |
| Hydrocarbon | | | | | |
| Kerosine | 5 | 15 | | 20 | 30 |
| Fuel oil | | | 5 | | |
| Water | | | | | |
| Brine (NaCl 0.5%) | | | | | |
| Brine (NaCl 2.0%) | 80 | | | 60 | 50 |
| Seawater | | 65 | 75 | | |
| Properties | | | | | |
| Visual appearance | o | o | o | o | o |
| Interfacial tension ($\times 10^{-2}$ cyne/cm) | 0.34 | 0.08 | 0.02 | 0.24 | 0.04 |
| Viscosity (centipoise) | 8 | 12 | 7 | 27 | 22 |
| Petroleum recovery (%) | 96 | 98 | 97 | 96 | 97 |

We claim:

1. A micellar slug for use in the recovery of oil, said micellar slug consisting essentially of 4% to 90% by weight of a hydrocarbon, 4% to 92% by weight of an aqueous medium, 3% to 30% by weight of a surfactant containing, as an essential component, an internal olefin sulfonate having 10 to 30 carbon atoms, and 0.1% to 20% by weight of a cosurfactant.

2. A micellar slug as claimed in claim 1, wherein said surfactant is an internal olefin sulfonate having 12 to 26 carbon atoms.

3. A micellar slug as claimed in claim 1, wherein said cosurfactant has the general formula:

$$R^3O(CH_2CH_2O)_nH$$

wherein n is a number of from 0 to about 4 and $R^3$ is an alkyl or alkenyl group having 2 to 8 carbon atoms when n is zero and an alkyl, alkenyl, or alkylphenyl group having 6 to 18 carbn atoms when n is not zero.

4. A process for producing oil from an oil-bearing subterranean reservoir penetrated by a well which comprises the steps of:

(1) injecting into said reservoir through said well a micellar slug consisting essentially of 4% to 90% by weight of a hydrocarbon 4% to 92% by weight of an aqueous medium, 3% to 30% by weight of a surfactant containing, as an essential component, an internal olefin sulfonate having 10 to 30 carbon atoms, and 0.1% to 20% by weight of a cosurfactant;

(2) injecting into said reservoir at least one driving fluid; and (3) recovering oil from said reservoir through the production well.

* * * * *